(12) United States Patent
Edwards (10) Patent No.: US 12,377,707 B2
(45) Date of Patent: Aug. 5, 2025

(54) AUXILIARY POWER UNIT AND METHOD FOR A VEHICLE

(71) Applicant: IAPUHVACS Corporation, Hammond, LA (US)

(72) Inventor: David E. Edwards, Chelsea, AL (US)

(73) Assignee: IAPUHVACS Corporation, Hammond, LA (US)

(*) Notice: Subject to any disclaimer, the term of this patent is extended or adjusted under 35 U.S.C. 154(b) by 0 days.

(21) Appl. No.: 18/588,519

(22) Filed: Feb. 27, 2024

(65) Prior Publication Data
US 2025/0170870 A1    May 29, 2025

Related U.S. Application Data (63) Continuation of application No. 18/523,149, filed on Nov. 29, 2023.

(51) Int. Cl.
| | |
|---|---|
| *B60H 1/00* | (2006.01) |
| *B60H 1/18* | (2006.01) |

(Continued)

(52) U.S. Cl.
CPC ........... *B60H 1/00435* (2013.01); *B60H 1/18* (2013.01); *F02B 63/042* (2013.01); *F02B 63/06* (2013.01);

(Continued)

(58) Field of Classification Search
CPC ....... B60H 1/00435; B60H 1/18; F02B 63/06; B60K 13/04; B60R 16/033; F16D 27/00
See application file for complete search history.

(56) References Cited

U.S. PATENT DOCUMENTS

| | | |
|---|---|---|
| 3,844,130 A | 10/1974 | Wahnish |
| 4,825,663 A | 5/1989 | Nijjar et al. |

(Continued)

FOREIGN PATENT DOCUMENTS

| | | | |
|---|---|---|---|
| CN | 106004324 A | * 10/2016 | ......... B60H 1/00807 |
| WO | 2012060326 A1 | 5/2012 | |

(Continued)

OTHER PUBLICATIONS

Qin et al. (CN106004324A), English Translation, Engineering vehicle with air conditioning system, 2016, Whole Document (Year: 2016).*

(Continued)

*Primary Examiner* — Jerry-Daryl Fletcher
*Assistant Examiner* — Keith Stanley Myers
(74) *Attorney, Agent, or Firm* — Christopher B. Kilner; William F. Nixon; Millen, White, Zelano & Branigan, P.C.

(57) ABSTRACT

An auxiliary power unit for a vehicle is configured to provide cool or heated air within the vehicle with the main engine off. The auxiliary power unit includes an auxiliary diesel engine that receives fuel from the fuel tank of the vehicle. The auxiliary diesel engine is connected to a hydraulic pump of a hydraulic power system by a first magnetic clutch to provide mechanical power. The hydraulic pump converts the mechanical power to hydraulic power. The hydraulic power system delivers the hydraulic power to a hydraulic compressor drive motor that converts it back to mechanical power. The hydraulic power system is connected to a compressor drive via a second magnetic clutch. The compressor drive provides power to an air conditioner (AC) compressor of the vehicle such that the AC compressor activates while the auxiliary power unit is operating.

20 Claims, 5 Drawing Sheets

(51) Int. Cl.
    *B60R 16/033*     (2006.01)
    *F02B 63/04*     (2006.01)
    *F02B 63/06*     (2006.01)
    *F16D 27/00*     (2006.01)
    *B60K 13/04*     (2006.01)

(52) U.S. Cl.
    CPC ............. *B60K 13/04* (2013.01); *B60R 16/033* (2013.01); *F16D 27/00* (2013.01)

(56) References Cited

U.S. PATENT DOCUMENTS

| | | | |
|---|---|---|---|
| 5,125,236 A * | 6/1992 | Clancey | H02J 9/066 |
| | | | 62/239 |
| 5,177,978 A * | 1/1993 | Brown | B60H 1/3222 |
| | | | 62/239 |
| 8,723,344 B1 | 5/2014 | Dierickx | |
| 10,926,610 B2 | 2/2021 | Schumacher et al. | |
| 11,022,451 B2 | 6/2021 | Srnec et al. | |
| 11,059,352 B2 | 7/2021 | Leasure | |
| 11,203,262 B2 | 12/2021 | Schumacher et al. | |
| 11,273,684 B2 | 3/2022 | Holmstrom et al. | |
| 11,318,856 B2 | 5/2022 | Macaluso | |
| 11,345,225 B2 | 5/2022 | Fisher | |
| 2003/0070849 A1 * | 4/2003 | Whittaker | F02B 63/00 |
| | | | 180/68.2 |
| 2006/0107920 A1 | 5/2006 | Serkh | |
| 2006/0131885 A1 * | 6/2006 | Wurtele | B60H 1/00378 |
| | | | 290/1 A |
| 2013/0325257 A1 * | 12/2013 | Waldschmidt | B60H 1/3232 |
| | | | 701/36 |
| 2015/0041414 A1 | 2/2015 | Squillante | |
| 2023/0356824 A1 * | 11/2023 | Ripoll | B63J 2/02 |

FOREIGN PATENT DOCUMENTS

| | | |
|---|---|---|
| WO | 2015043821 A1 | 4/2015 |
| WO | 2021112790 A1 | 6/2021 |

OTHER PUBLICATIONS

International Search Report and Written Opinion for PCT/US2024/056869 dated Feb. 3, 2025.

* cited by examiner

AUXILIARY POWER UNIT AND METHOD FOR A VEHICLE

FIELD OF THE INVENTION

The present invention relates to an auxiliary power unit for heating, ventilation, or providing cool air within a vehicle using the vehicle's climate control system.

DESCRIPTION OF THE RELATED ART

Every day, our nation is traversed by millions of semi-trucks pulling various trailers. These enormous trucks are responsible for transporting the majority of all goods in the United States. Approximately 70% of these semi-trucks are equipped with living quarters located behind the cab, where the driver may sleep, cook, and otherwise unwind.

A heating, ventilation, and air conditioning (HVAC) system is a highly crucial component of the truck when it is moving down the road, and possibly even more so while it is parked with the driver still inside of it. This is because these trucks roll in all kinds of weather, and the HVAC systems must be able to accommodate driver comfort. Operating the primary truck engine while it is parked in order to power the HVAC system is not only inefficient from a financial standpoint but also wastes precious natural resources and contributes to harmful emissions. In the US, heavy-duty vehicles account for 4% of the vehicles, but are responsible for over 20% of the total transportation petroleum use, with the long-haul trucking sector responsible for 70% of that total.

SUMMARY OF THE INVENTION

An auxiliary power system configurable within a vehicle having a main engine and a cab area is disclosed. The auxiliary power system includes an auxiliary diesel engine coupled to a hydraulic pump via a power coupling. The auxiliary diesel engine activates the hydraulic pump during operation. The auxiliary power system also includes a first magnetic clutch to drive the hydraulic pump through the power coupling. The auxiliary power system also includes a hydraulic compressor drive motor connected to the hydraulic pump. The hydraulic compressor drive motor converts hydraulic power to mechanical power. The auxiliary power system also includes a compressor drive mechanically connected to the hydraulic compressor drive motor to receive the mechanical power. The auxiliary power system also includes an air conditioning compressor within the vehicle configured to receive the mechanical power from the compressor drive. The air conditioning compressor is activated to provide cooled air when the auxiliary diesel engine is activated and the first magnetic clutch is engaged.

An auxiliary power system configurable within a vehicle having a main engine and a cab area is disclosed. Cooled air is supplied within the cab using an air conditioning compressor within the vehicle. The auxiliary power system includes an auxiliary diesel engine having a power coupling. The auxiliary diesel engine receives fuel from a diesel fuel tank of the vehicle during operation. The auxiliary power system also includes a hydraulic power system coupled to the auxiliary diesel engine via the power coupling. The hydraulic power system converts hydraulic power to mechanical power. The auxiliary power system also includes a compressor drive mechanically connected to the hydraulic power system to receive the mechanical power. The auxiliary power system also includes an air conditioning compressor within the vehicle configured to receive the mechanical power from the compressor drive. The air conditioning compressor is activated to provide the cooled air when the auxiliary engine is activated.

A method for operating an air conditioning compressor in a vehicle having a cab and a main engine is disclosed. The method includes activating an auxiliary diesel engine coupled to a hydraulic pump through a power coupling. The hydraulic pump moves hydraulic fluid from a hydraulic reservoir. The method also includes receiving the hydraulic fluid from the hydraulic pump at a hydraulic compressor drive motor. The method also includes converting hydraulic power to mechanical power at the hydraulic compressor drive motor. The method also includes providing the mechanical power from the hydraulic compressor drive motor to a compressor drive. The method also includes activating the air conditioning compressor by the compressor drive. The air conditioning compressor provides cooled air when the auxiliary diesel engine is operating.

The disclosed embodiments implement an alternative power source operating the truck's primary HVAC components. Traditionally, APUs have not integrated or utilized the truck's factory installed, primary HVAC system. The sub-optimal performance of these secondary HVAC components versus the truck's factory installed, primary HVAC, plus the additional cost & maintenance of the secondary HVAC system, has resulted in limited APU adoption across the trucking industry, and less repair of failed units. Thus, there is a need for a method by which the optimal factory installed HVAC systems found on semi-trucks may be powered by an APU, not requiring the use of the primary truck engine.

Reference is made herein to an auxiliary power system as well as an auxiliary power unit, or APU. The term of an auxiliary power system refers to the features disclosed below plus existing components on a vehicle. The auxiliary power system may include features in addition to those disclosed below. The auxiliary power unit is a component within the auxiliary power system and disclosed below.

The disclosed embodiments provide an APU that integrates with the truck's factory installed or primary HVAC. The disclosed embodiments enable the application, or the use, of hydraulics to transfer APU power production to turn the truck's existing, factory installed AC compressor thus creating an "engine off" mode that performs as good or better than the existing "engine idle" mode. This feature also applies to heating.

Add-on components associated with existing APUs, installed wherever possible, cannot be in optimal locations simply because optimal locations are already taken up by the factory installed components, which the disclosed embodiments utilize. Truck manufacturers have spent decades perfecting the HVAC systems in their trucks for optimal performance and cannot be approached in performance by a system that uses aftermarket components that are required to be installed anywhere that is "leftover" in the truck's design and manufacture.

The disclosed embodiments use an integrated approach. The disclosed embodiments include a method of powering the truck's existing, factory installed HVAC components with the smaller, more efficient power source, in this case a small diesel engine, instead of the truck's main drive engine. Whether built-in to the truck's design (OEM) or installed once the truck is in service (after market), by using the disclosed embodiments, truck occupants will get the full performance of the truck's factory installed HVAC system. These components, namely the condensation collection system and the exhaust heat exchanger, may enhance the factory installed, primary HVAC system performance by providing additional heating and cooling performance. Like the windshield wiper delay switch, this concept gives the truck designer/builders an APU HVAC system that can effectively become standard equipment rather than an "add on" system.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining within the scope of the disclosed embodiments.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments include a hydraulic power system to drive an air conditioning (AC) compressor from an APU engine. The hydraulic system may include a hydraulic pump, a hydraulic filter, a hydraulic heat exchanger, a hydraulic compressor drive motor, a hydraulic reservoir, and hydraulic lines. The disclosed embodiments also may implement a first magnetic clutch and a second magnetic clutch along with a compressor drive to disconnect from the AC compressor when the main engine of the vehicle is activated. The magnetic clutches may be used to connect and disconnect both the hydraulic pump to the APU engine and the hydraulic motor to the existing AC compressor, depending on whether the APU or the main engine is utilized.

The disclosed embodiments also may implement a pump shock absorbing drive coupler. The disclosed embodiments also may implement an adapter in the tank vent line such that the existing fuel system configuration is not disturbed. The disclosed embodiments also may include an add-on drive pulley that allows powering the existing AC compressor from a second power source, wherein the power source, such as the main engine or the hydraulic power system, may be selected.

In some embodiments, to accomplish powering the truck's existing HVAC systems, a small diesel engine having a minimum 16 horsepower (HP) may serve as the APU. This engine is EPA tier IV certified so as to be allowed to operate in all fifty (50) states in the U.S. and in countries with similar environmental requirements. The diesel engine drives an alternator(s) providing electrical power and turning a hydraulic pump that will drive a hydraulic motor connected to the truck's existing AC compressor. The truck's HVAC system will then function as if the truck's main engine were running. In further embodiments, the alternator driven by the APU will provide 12 VDC power to charge the truck's batteries, operate the electric radiator/condenser cooling fan and truck's HVAC components along with the APU's control unit and the various switches, valves, and clutches as required.

Alternatively, a power source other than a diesel engine may be used to power the auxiliary power unit. For example, an electric motor or other battery powered source may be used. Even though mechanical power is disclosed below, electric power or other types of power also may be used. Other power sources not normally used or not currently in use on vehicles also may be used according to the disclosed embodiments as long as power is provided to the hydraulic power system disclosed below.

In some embodiments, the truck's AC compressor turned by the hydraulic motor through a magnetic clutch will provide freon pressure in the truck's existing AC system as the electric fan pulling through the condenser removes the heat energy. In some embodiments, in cold conditions, the hydraulic system will be deactivated as the warm coolant from the APU, supplemented by the exhaust heat exchanger, will be used by the truck's HVAC air handlers to heat the cab/sleeper. Heated coolant may be routed through the truck's main engine to keep it warm.

In some embodiments, an auxiliary power unit (APU) is used in conjunction with components on a sleeper-type semi-truck having a main engine, a cab area, and a sleeper area. These embodiments also may include an exterior enclosure adapted to be disposed on an exterior of a sleeper-type semi-truck. These embodiments also may include an auxiliary diesel engine contained within the exterior enclosure.

Some embodiments also may include a shock absorbing electromagnetic clutch direct driving the hydraulic system pump through a power coupling that may be mechanically connected to a main rotary output of the auxiliary diesel engine so that the hydraulic power system may be disengaged when not needed. Some embodiments also may include an alternator pulley disposed on one side on the auxiliary diesel engine, opposite the main rotary output. The alternator pulley drives the first belt and, in turn, drives an alternator thereby allowing for continuous operation anytime the auxiliary diesel engine may be running. Some embodiments also may include a system controller, or the truck's existing ECM, to monitor or control the APU engine RPM, freon pressure, hydraulic oil, APU coolant, and evaporator temperatures, cabin temperature and set point, clutches, and the like.

In some embodiments, the exterior enclosure may be manufactured with a structural steel frame. In some embodiments, the structural steel frame may be covered with an aluminum alloy plate along with integral mounting hardware to allow for mechanical mounting to structurally suitable elements of the sleeper type semi-truck, while providing vibration isolation. In some embodiments, the aluminum alloy plate may be one-eighth inch thick. In some embodiments, the exterior enclosure and its mechanical connections function in a mobile environment under extreme weather conditions for long periods of time. In some embodiments, the auxiliary diesel engine utilizes multiple mounting feet and vibration isolators to connect to the exterior enclosure to provide vibration isolation for its attachment points.

In some embodiments, the engine coolant circulated by the coolant pump of the auxiliary diesel engine will provide heating as well and may be augmented by an exhaust heat exchanger system. In some embodiments, the auxiliary diesel engine includes two to three cylinders and has an output of at least 16 HP at 3,600 rotations per minute (RPM) and is EPA tier IV certified so as to be allowed to operate in all fifty (50) states in the U.S. and in countries with similar environmental requirements. In some embodiments, the alternator provides direct current (DC) power for the auxiliary diesel engine and truck's systems as well as maintaining the truck's batteries. In some embodiments, the alternator may be 100 amp. The disclosed embodiments also may use multiple alternators. In some embodiments, the system controller also controls the magnetic clutch and compressor drive, the magnetic clutch, the auxiliary diesel engine, and the diverter valve. In some embodiments, the system controller may be utilized by the user to start and control the auxiliary power unit to vary heat and cooling production.

In some embodiments, the system controller will control the auxiliary diesel engine at an optimal RPM to drive the air conditioning compressor at the RPM necessary to get higher performance needed without waste and humid air shock, or variable to minimal performance at reduced energy consumption/emissions, resulting in an improved system that also may be environmentally friendly. In some embodiments, the system controller monitors the evaporator exhaust temperature and adjusts the RPM of the compressor output.

In some embodiments, the auxiliary power unit may be installed on a sleeper-type semi-truck, or truck. In some embodiments, the auxiliary power unit provides heating capability by tie in to truck's coolant system and by capture of exhaust energy where more than adequate heat energy will be captured, with the excess used to keep a main propulsion engine of the sleeper-type semi-truck warm. In some embodiments, the sleeper-type semi-truck may be kept warm by the automatic heater valve set that actuates when the auxiliary diesel engine may be started.

Figure 1:
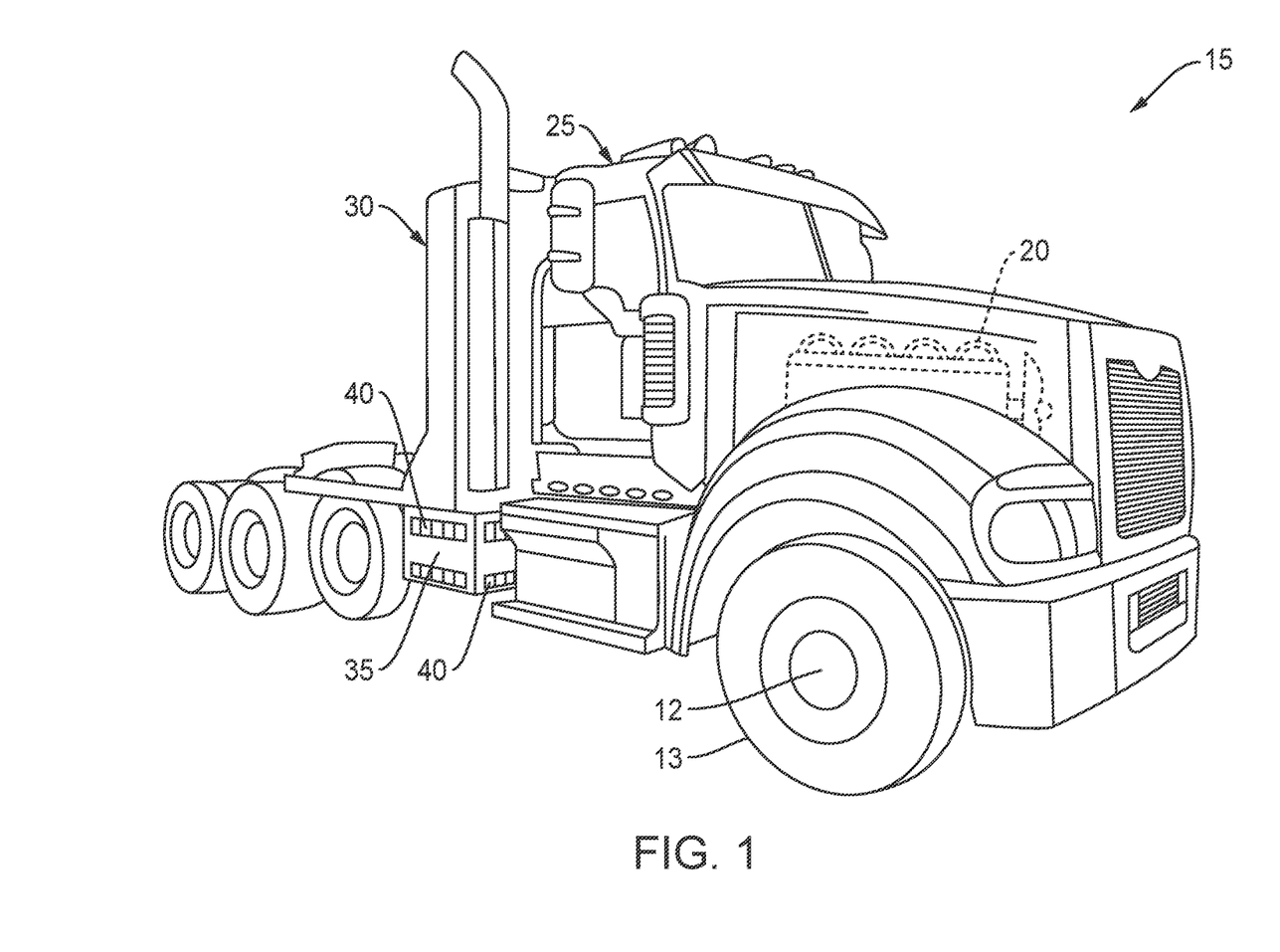
FIG. 1 illustrates a perspective view of a vehicle having a sleeper-type arrangement according to the disclosed embodiments.

FIG. 1 depicts a perspective view of a vehicle 15 having a sleeper-type arrangement according to the disclosed embodiments. In some embodiments, vehicle 15 is a sleeper-type, semi-truck, or tractor trailer cab. Vehicle 15 includes an auxiliary power unit (APU), disclosed in greater detail below, that powers the existing HVAC system for vehicle 15.

Vehicle 15 includes a main engine 20, located forward of a cab area 25. When operating, main engine 20 generates power to operate systems within vehicle 15, such as the HVAC system. Vehicle 15 also includes a sleeper area 30, where an occupant may get out of cab area 25 to rest or privacy while vehicle 15 is parked. The APU, as disclosed below, is configured to provide power within vehicle 15, especially to operate the HVAC system already installed in the vehicle.

An exterior enclosure 35 is located on the exterior of vehicle 15. In FIG. 1, exterior enclosure 35 is attached to the lower frame of vehicle 15. Exterior enclosure 35, however, may be located anywhere on vehicle 15. Exterior enclosure 35 may be comprised of a structural steel frame. This frame may be a ⅛-inch-thick angle, round, or box tubing steel along with integral mounting hardware to allow for mechanical mounting to structurally suitable elements of vehicle 15, while providing vibration isolation. Exterior enclosure 35 and its mechanical connection are capable of functioning in a mobile environment under extreme weather conditions for long periods of time. Multiple ventilation openings 40 are provided to allow for induction air for an auxiliary diesel engine, disclosed in greater detail in FIG. 2, along with any associated components. The exhaust for the auxiliary diesel engine may be routed out of exterior enclosure 35, then through the exhaust system of the vehicle.

Vehicle 15 also includes wheels 12 having tires 13. These features show that vehicle 15 is mobile and changes locations frequently. Thus, vehicle 15 may not have ready access to a power source outside vehicle 15. When moving, vehicle 15 may rely on main engine 20 to provide power to the components and systems for cab area 25 and sleeper area 30.

Figure 2:
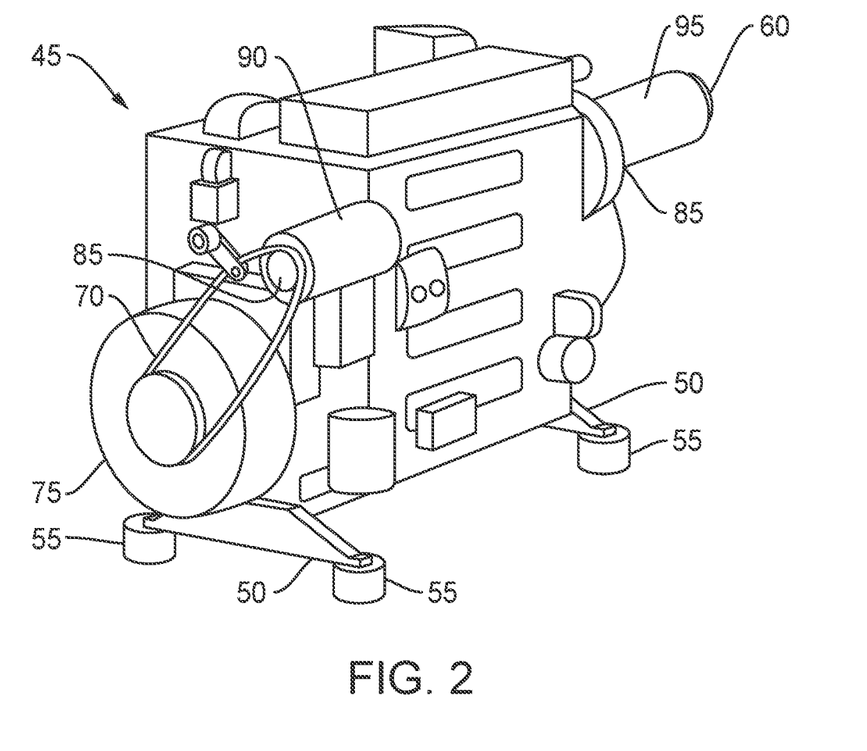
FIG. 2 illustrates a perspective view of an auxiliary diesel engine according to the disclosed embodiments.

FIG. 2 depicts a perspective view of an auxiliary diesel engine 45 according to the disclosed embodiments. Auxiliary diesel engine 45 is a component within the auxiliary power unit 10. Auxiliary diesel engine 45 may be housed within exterior enclosure 35, or mounted on vehicle 15. In some embodiments, auxiliary diesel engine 45 may be provided with 2 or 3 cylinders that produce about 16 HP at 3600 RPMs and is EPA tier IV certified so as to be allowed to operate in all fifty (50) states in the U.S. and in countries with similar environmental requirements. Auxiliary diesel engine 45 may include an electric starter and a water-based cooling system. Auxiliary diesel engine 45 also may receive its fuel from main fuel tanks of vehicle 15.

Auxiliary diesel engine 45 may use multiple mounting feet 50 to stabilize the position of the auxiliary diesel engine when vehicle 15 is moving. Vibration isolators 55 may be connected to mounting feet 50 and used to connect to exterior enclosure 35. Vibration isolators 55 and mounting feet 50 provide for a reduction in vibrations to auxiliary diesel engine 45.

Auxiliary diesel engine 45 may operate when main engine 20 is not operating to provide power to the HVAC system of vehicle 15. The main rotary output of auxiliary diesel engine 45 is connected to hydraulic pump 95. Hydraulic pump 95 draws hydraulic fluid from a hydraulic reservoir 160, disclosed in greater detail below. The hydraulic fluid is used within hydraulic power system, also disclosed in greater below.

Hydraulic pump 95 converts the mechanical power from auxiliary diesel engine 45 into fluid power using positive displacement. The hydraulic fluid is subjected to pressure using a reciprocating or rotary action supplied by auxiliary diesel engine 45. The mechanical action at hydraulic pump 95 creates a vacuum at its inlet and, combined with gravity, forces fluid into hydraulic pump 95. The fluid drawn into hydraulic pump 95 is forced by the rotation of the pump's action, which forces the hydraulic fluid towards the outlet, or towards other components within the hydraulic power system, resistance of which causes the pressure to rise.

An electromagnetic clutch 60 may direct drive hydraulic pump 95 through power coupling 85. Electromagnetic clutch 60 connects and disconnects from the hydraulic power system and auxiliary diesel engine 45 as needed. Thus, the hydraulic power system may be disengaged when not needed. Further, the disclosed embodiments may not want hydraulic pump 95 engaged when starting auxiliary diesel engine 45. Power coupling 85 may implement a design that absorbs shocks by using two pulleys configured face to face, coupled by a shock absorbing medium.

On the side of auxiliary diesel engine 45 opposite hydraulic pump 95 and the main output, an alternator pulley 75 is configured to drive a first belt 70. First belt 70 drives one or more alternators 90. One alternator 90 is shown and disclosed below for brevity. Alternator 90 may be a 100 amp alternator that allows for continuous operation when auxiliary diesel engine 45 is in operation. Alternator 90 converts mechanical energy produced by auxiliary diesel engine 45 into electrical energy that may be used by vehicle 15. In some embodiments, electrical energy produced by alternator 90 may be used to provide DC power for auxiliary diesel engine 45 and auxiliary power unit 10 as well as the battery or batteries for vehicle 15.

Thus, auxiliary diesel engine 45 provides output using fuel from the main tanks within vehicle 15 to drive hydraulic pump 95 for pumping hydraulic fluid. It also may be used to engage alternator pulley 75 to drive alternator 90 using first belt 70. These outputs are used to provide the functionality and features disclosed by auxiliary power unit 10.

Figure 3:
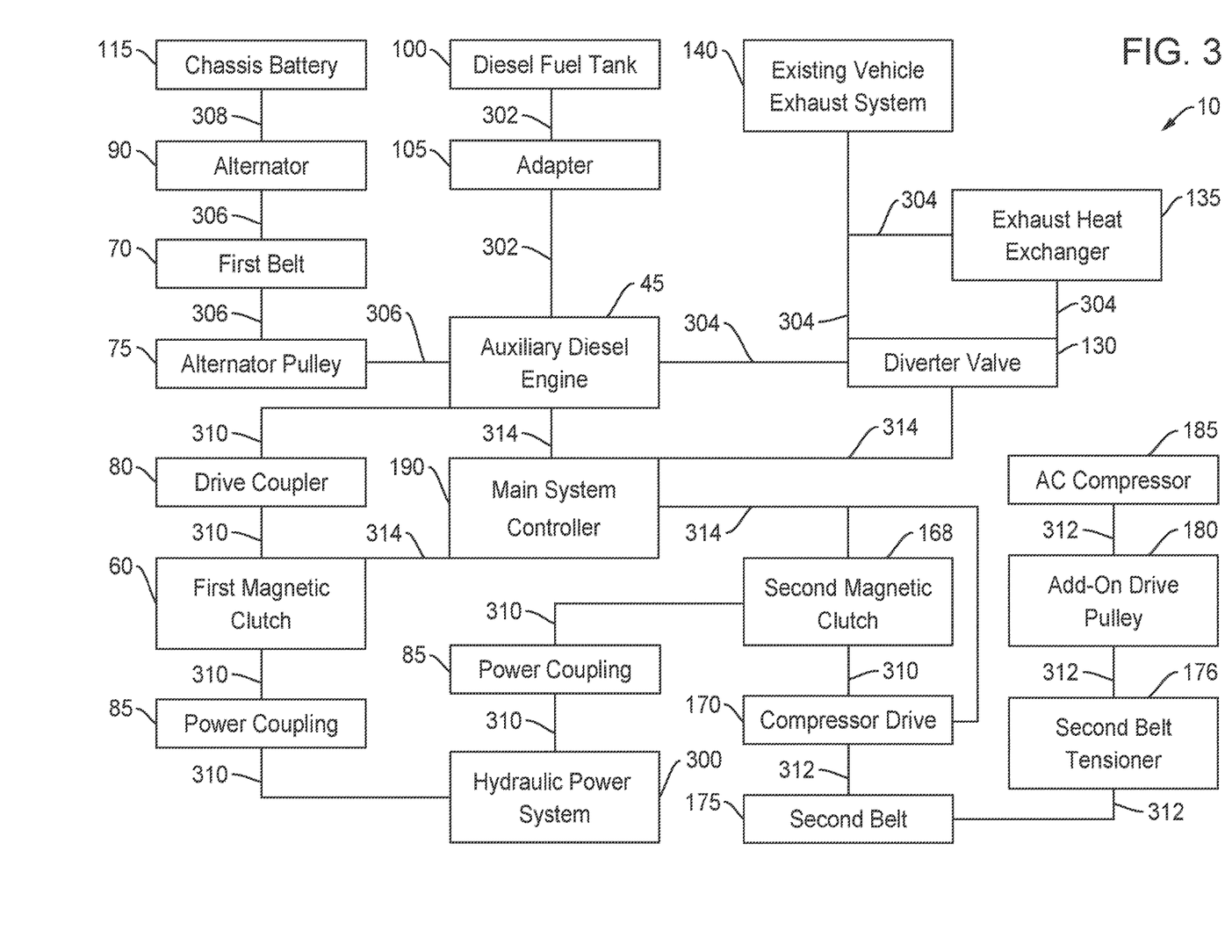
FIG. 3 illustrates a block diagram of an auxiliary power unit and other components used within the vehicle to provide climate control according to the disclosed embodiments.

FIG. 3 depicts a block diagram of auxiliary power unit 10 and other components used within vehicle 15 to provide climate control according to the disclosed embodiments. Auxiliary diesel engine 45 is shown connected to adapter 105 using fuel line 302. Auxiliary diesel engine 45 draws fuel from diesel fuel tank 100 of vehicle 15 through adapter 105, which is connected to tank 100 by a fuel line 302. Adapter 105 may be within the fuel line from diesel fuel tank 100 to auxiliary diesel engine 45. Diesel fuel tank 100 also may have a shutoff valve to prevent fuel from being delivered into fuel lines 302. Thus, auxiliary diesel engine 45 does not need its own separate fuel source according to these features.

Chassis battery, or batteries, 115 may power the starter in auxiliary diesel engine 45. Chassis battery 115 also may be recharged by auxiliary diesel engine 45 while the engine is in operation. Chassis battery 115 is connected to alternator 90, disclosed above, by electrical connection 308. Alternator 90 generates electrical energy via drive belt connection 306 with first belt 70. Alternator pulley 75 drives alternator 90 using mechanical power from auxiliary diesel engine 45. The negative side of chassis battery 115 is connected to a ground connection.

Auxiliary diesel engine 45 may create exhaust that is removed from auxiliary power unit 10 using exhaust connections 304. Engine exhaust from auxiliary diesel engine 45 is carried through an exhaust connection 304 to a diverter valve 130. Diverter valve 130 routes the engine exhaust through exhaust connections 304 to an exhaust heat exchanger 135. Alternatively, diverter value 130 may route the engine exhaust directly to existing vehicle exhaust system 140. Diverter valve 130 may be configured especially for use with auxiliary diesel engine 45.

As disclosed above, any mechanical output from auxiliary diesel engine 45 passes through first electromagnetic clutch 60. Pump shock driver coupler 80 may be configured to connect between auxiliary diesel engine 45 and first electromagnetic clutch 60 using mechanical connections 310.

First electromagnetic clutch 60 is connected to power coupling 85 through a mechanical connection 310. Power coupling 85, in turn, is connected to hydraulic power system 300 by a mechanical connection 310. Thus, mechanical power is delivered to hydraulic power system 300 from auxiliary diesel engine 45.

Figure 4:
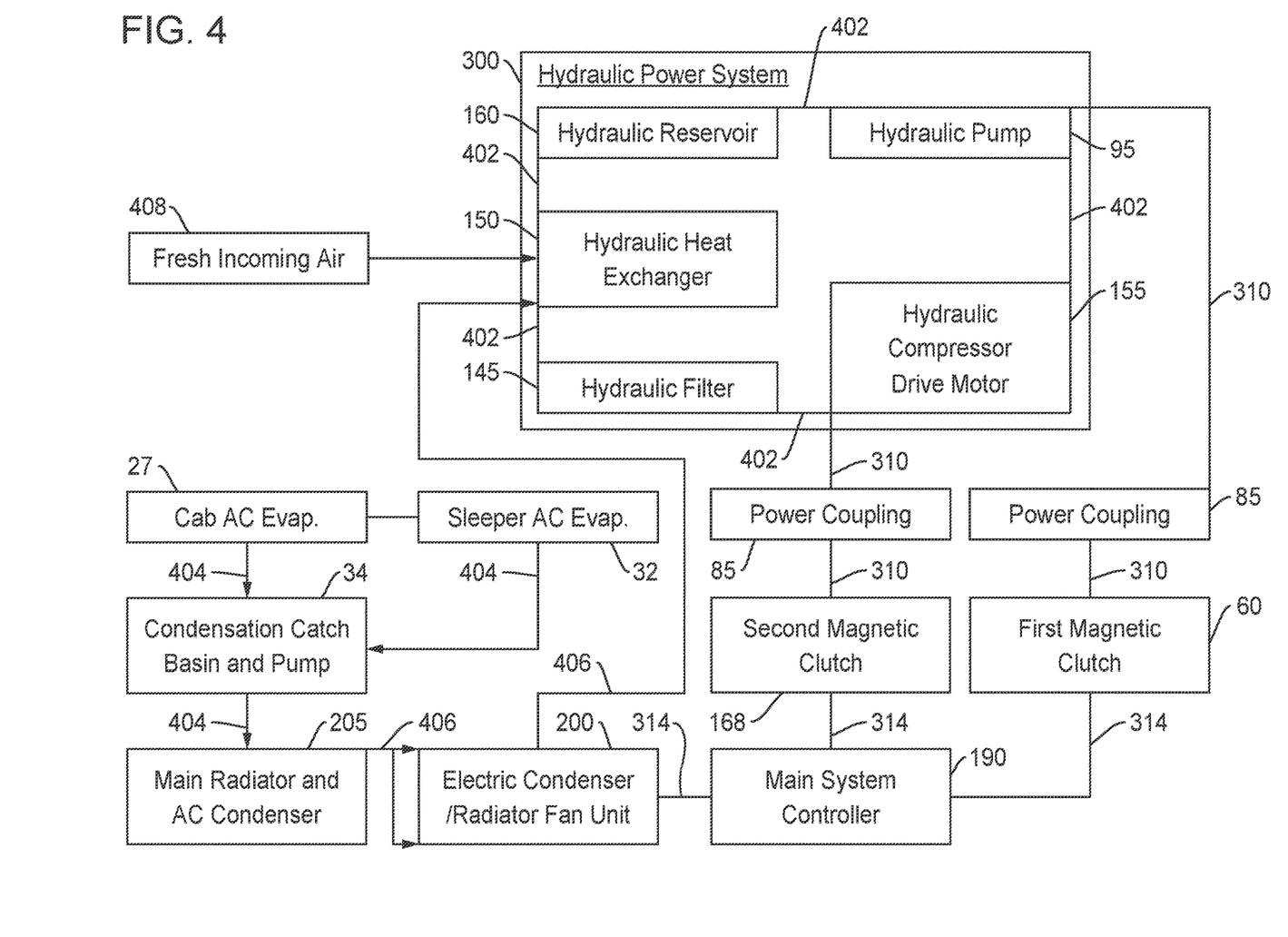
FIG. 4 illustrates a block diagram of a hydraulic power system used within the auxiliary power unit according to the disclosed embodiments.

Hydraulic power system 300 is disclosed in greater detail by FIG. 4. Hydraulic power system 300 converts the mechanical power from auxiliary diesel engine 45 into hydraulic power within vehicle 15 such that separate components for auxiliary power unit 10 are not unwieldy to install. Hydraulic pump 95 converts the mechanical power into hydraulic power within hydraulic power system 300, which delivers that power to compressor drive 170. Hydraulic power system 300 includes a hydraulic compressor drive motor 155, disclosed in greater detail below, to convert the hydraulic power within hydraulic power system 300 to mechanical power.

The output of hydraulic power system 300 is provided to power coupling 85 through a mechanical connection 310 to second electromagnetic clutch 168. In some embodiments, rotary power from hydraulic compressor drive motor 155 is passed through second electromagnetic clutch 168 via power coupling 85 to compressor drive 170 using mechanical connections 310. Compressor drive 170, in turn, controls AC compressor 185, which may be part of the installed HVAC system of vehicle 15.

Compressor drive 170 may control AC compressor 185 using second belt 175 through a second belt tensioner 176. Compressor drive 170 may use drive belt connections 312 provided using second belt 175. Second belt 175 may drive add-on drive pulley 180 located at AC compressor 185. Add-on drive pulley 180 may be used in conjunction with the main belt assembly within vehicle 15 for AC compressor 185. Second belt 175 may be of similar design to the belt currently used to drive AC compressor 185 in a continuous manner. These features allow for operation of AC compressor 185 within a conventional heating and air conditioning system as normally provided by the original equipment manufacturer (OEM) without the need to run main engine 20.

Auxiliary power unit 10 also may include a main system controller 190 to ensure proper operation and cooling of vehicle 15. System controller 190 may be configured to operate with controls of vehicle 15. System controller 190 may be utilized by the user to start and control auxiliary power unit 10 to vary heat and cooling. During cold weather operation, excess heat may be captured from auxiliary diesel engine 45 and components of hydraulic power system 300 to heat cab area 25 and sleeper area 30.

System controller 190 is connected to diverter valve 130, auxiliary diesel engine 45, first electromagnetic clutch 60, and second magnetic clutch 168 to control operation of auxiliary power unit 10. System controller 190 may operate clutches 60 and 168 to engage and disengage hydraulic power system 300 from the other components on vehicle 15. System controller 190 may control diverter 130 to divert exhaust from auxiliary diesel engine 45 to exhaust heat exchanger 135 or to existing vehicle exhaust system 140. System controller 190 also may activate auxiliary diesel engine 45 in order to provide mechanical power to hydraulic power system 300.

FIG. 4 depicts a block diagram of hydraulic power system 300 used within auxiliary power unit 10 according to the disclosed embodiments. As disclosed above, hydraulic power system 300 receives mechanical power generated by auxiliary diesel engine 45 and converts it to hydraulic power.

The hydraulic power moves through hydraulic power system 300 until it is converted back to mechanical power to be used for operating AC compressor 185 using compressor drive 170.

Hydraulic power system 300 includes hydraulic pump 95, disclosed above. Hydraulic pump 95 receives mechanical power from auxiliary diesel engine 45 through power coupling 85. First magnetic clutch 60 is used to connect hydraulic pump 95 to auxiliary diesel engine 45. Hydraulic power system 300 also includes hydraulic compressor drive motor 155, hydraulic filter 145, hydraulic heat exchanger 150, and hydraulic reservoir 160. These components are connected by hydraulic lines 402, which move hydraulic fluid through hydraulic power system 300. These components are disclosed in greater detail below.

Hydraulic fluid moves through hydraulic lines 402 using hydraulic pressure created by hydraulic pump 95. Hydraulic pressure is sent from hydraulic pump 95 to hydraulic compressor drive motor 155. Hydraulic compressor drive motor 155 converts the hydraulic power to mechanical, or rotary, power. This rotary power then may be used to operate the climate control system, or AC compressor 185, of vehicle 15. The mechanical power is passed through power coupling 85 to second magnetic clutch 168, which is used to connect and disconnect hydraulic compressor drive motor 155 to compressor drive 170. As disclosed above, compressor drive 170 may drive AC compressor 185 using second belt 175, second belt tensioner 176, and add-on drive pulley 180.

The hydraulic fluid discharged by hydraulic compressor drive motor 155 is passed through hydraulic filter 145. Hydraulic filter 145 may remove damaging particulates from the hydraulic fluid within hydraulic line 402. Hydraulic filter 145 may include a porous filter element to catch contaminants to prevent them from re-entering the fluid flow and damaging other pieces of hydraulic power system 300 downstream of the hydraulic filter.

The hydraulic fluid discharged by hydraulic compressor drive motor 155 also may be heated up due to compression as well as air and other heat sources. Thus, hydraulic power system 300 may remove this heat within the hydraulic fluid in hydraulic lines 402 using hydraulic heat exchanger 150. Hydraulic heat exchanger 150 may use fresh incoming air 408 for cooling as well as air 406 from electric condenser/radiator fan unit 200. In some embodiments, hydraulic heat exchanger 150 may use air. In other embodiments, hydraulic heat exchanger 150 may include cool water that flows inside tubes. Hot hydraulic fluid may flow around the cooled water tubes to exchange heat.

The hydraulic fluid is returned to hydraulic reservoir 160 through hydraulic line 402 from hydraulic heat exchanger 150. The hydraulic fluid should be filtered and cooled so that it may be used by hydraulic pump 95 while auxiliary diesel engine 45 is operating. Thus, hydraulic power system 300 serves to provide mechanical power to AC compressor 185 using auxiliary diesel engine 45. Hydraulic power system 300 may be implemented without significant changes to vehicle 15. Further, hydraulic power system 300 may be incorporated into a vehicle 15 during manufacturing so that using auxiliary power unit 10 is seamless and easy to use.

Efficient cooling production may be enhanced using a system that collects condensation water from existing component within vehicle 15. Vehicle 15 may include cab AC evaporator 27 and sleeper AC evaporator 32 within cab area 25 and sleeper area 30, respectively. The condensation is collected and moved through condensation lines 404 to condensation catch basin and pump 34. Condensation catch basin and pump 34 allows for water cooling of AC condenser 205 by using the condensation from evaporators 27 and 34 and spraying it into condenser 205. Intermittent water cooling of the AC condenser that is normally air cooled provides for higher efficiency heat removal providing for higher performance AC and lower freon pressure.

In some embodiments, condensation catch basin and pump 34 may operate as follows. The condensation is collected and a sensor activates a pump when the water reaches the sensor. The pump is activated for three (3) seconds using a timer, emptying the contents of the basin into the condenser, thereby cooling it substantially as the water of the condensation evaporates. A timer setting should be set to operate so as to not empty the basin as the basin volume should be to provide water flow cycles as often as possible based on atmospheric humidity. For example, the timer setting may be about every five (5) minutes, depending on the situation. This feature lowers the temperature of the freon, which causes a more efficient evaporation in the evaporator. The evaporator exhaust temperature is lowered, thereby providing cabin cooling air. The basin of condensation catch basin and pump 34 may not allow water to backup in the evaporator should the system be inactivated.

To ensure proper operation and cooling of the air conditioning system within vehicle 15, main system controller 190 provides for operation of electric condenser/radiator fan unit 200 to cool the main radiator and AC condenser of vehicle 15 as well as hydraulic heat exchanger 150 of hydraulic power system 300 while either engine is operational. Main system controller 190 also controls second magnetic clutch 168, compressor drive 170, first magnetic clutch 60, auxiliary diesel engine 45, and diverter valve 130.

In some embodiments, main system controller 190 may be built into the engine control module of vehicle 15, performing all functions of the controller without the need for the actual controller, thereby becoming part of vehicle 15. Main system controller 190 may be used to start and control auxiliary power unit 10 to vary heat and cooling production. During cold weather operation, excess heat would be captured from auxiliary diesel engine 45 or exhaust heat exchanger 135 to heat cab area 25 and sleeper area 30.

Further, during cold weather operation, hydraulic power system 300 including hydraulic pump 95, hydraulic compressor drive motor 155, hydraulic filter 145, hydraulic heat exchanger 150, and hydraulic reservoir 160 typically may not be utilized. The engine coolant circulated by the coolant pump of auxiliary diesel engine 45 may provide heating as well and may be augmented by exhaust heat exchanger 135 as needed. Efficient heating on main engine 20 is accomplished by an automatic heater valve set that actuates when auxiliary diesel engine 45 is started.

In some instances, a conventional HVAC of vehicle 15, particularly air conditioning, may be governed by engine RPM required for vehicle speed. As such, they may be over capacity to perform at low RPM, especially when idle or parked. To compensate, these systems cycle on and off the AC compressor or mix in outside air, actually heating the air. A conventional AC compressor may be engaged to cool down too rapidly, then deactivated to prevent an evaporator freezing condition, thereby allowing unconditioned air and humidity to enter the compartment. Not only does this waste capacity, but it also does not dehumidify the air, which results in a humid or "clammy" feeling.

The disclosed embodiments use main system controller 190 to control auxiliary diesel engine 45 at an optimal RPM to drive AC compressor 185 to the RPM necessary to get higher performance without waste and humid air. In some embodiments, the system may get up to eight (8) degrees Fahrenheit lower temperature. The disclosed embodiments also reduce energy consumption and emissions, thereby resulting in an improved system that is also environmentally friendly, or green. Auxiliary power unit 10 provides heating capability by augmentation by capturing the exhaust energy where more than adequate heat energy will be captured, with the excess used to keep the main propulsion engine of vehicle 15 warm.

The disclosed embodiments provide an efficient cooling operation accomplished in the following manner: in a conventional vehicle air conditioning system, the compressor cycles off at forty-two degrees Fahrenheit (42° F.) and turns back on at forty-nine degrees Fahrenheit (49° F.). In the case of the disclosed embodiments, main system controller 190 monitors the evaporator exhaust temperature and adjusts the RPM of the compressor output. Doing so maintains an evaporator exhaust temperature as low as approximately thirty-four degrees Fahrenheit (34° F.) when conditions permit. This temperature provides a safe margin above freezing but is still eight degrees Fahrenheit (8° F.) below the conventional minimum temperatures of forty-two degrees Fahrenheit (42° F.). This feature produces a temperature that is eleven-point-five degrees Fahrenheit (11.5° F.) below the average evaporator discharge temperature.

The disclosed embodiments may be utilized by a user in a simple and effortless manner with little or no training. The user would procure auxiliary power unit 10 from conventional procurement channels such as semi-truck manufacturers, aftermarket equipment integrators, mail order and internet supply houses and the like. It may be provided as standard or optional equipment on a new vehicle 15 as well as being made available as an add-on kit for an existing vehicle 15. The disclosed embodiments envision a stand-alone embodiment as well as an embodiment where auxiliary power unit 10 is built within vehicle 15.

After procurement and prior to utilization, auxiliary power unit 10 may be installed upon vehicle 15 using general guidance as supplied in FIG. 3. Interconnections to existing mechanical and electrical connections of vehicle 15 would be made. Such connections include but are not limited to diesel fuel tank 100, any chassis batteries 115, conventional exhaust system 140, and air conditioning compressor 185 as well as replacing the engine driven fan with an electric unit 200. At this point in time, auxiliary power unit 10 is ready for utilization.

During utilization of auxiliary power unit 10, the following procedure would be initiated: after vehicle 15 is parked, and the user wishes to remain in cab area 25 and/or sleeper area 30, the user would secure the vehicle in a normal manner. For example, the key is left in the "ON" or "Accessory" position. Next, auxiliary power unit 10 would be activated using main system controller 190. Auxiliary diesel engine 45 will be governed at peak torque/minimum fuel consumption at a given revolutions per minute (RPM) as required for HVAC operation and geared to alternator 90 so as to produce exiting RPM×2, thereby allowing alternator 90 to produce adequate energy to run the operation electrical system of vehicle 15 and charge/maintain chassis battery 115. Auxiliary power unit 10, at a governed RPM, will allow for reduced fuel consumption and noise/vibration and can respond to elevated alternator 90 draw.

As a result of air conditioning compressor 185 being driven by auxiliary power unit 10, acceptable heating and cooling levels inside sleeper area 30 and cab area 25 are maintained. This feature is achieved without operating main engine 20, thereby saving fuel consumption as well as wear and tear on main engine 20, along with a less harmful emissions/environmental impact. After use of auxiliary power unit 10, it is deactivated using main system controller 190. At this point in time, vehicle 15 may remain parked, or main engine 20 may be started allowing the resumption of travel.

Figure 5:
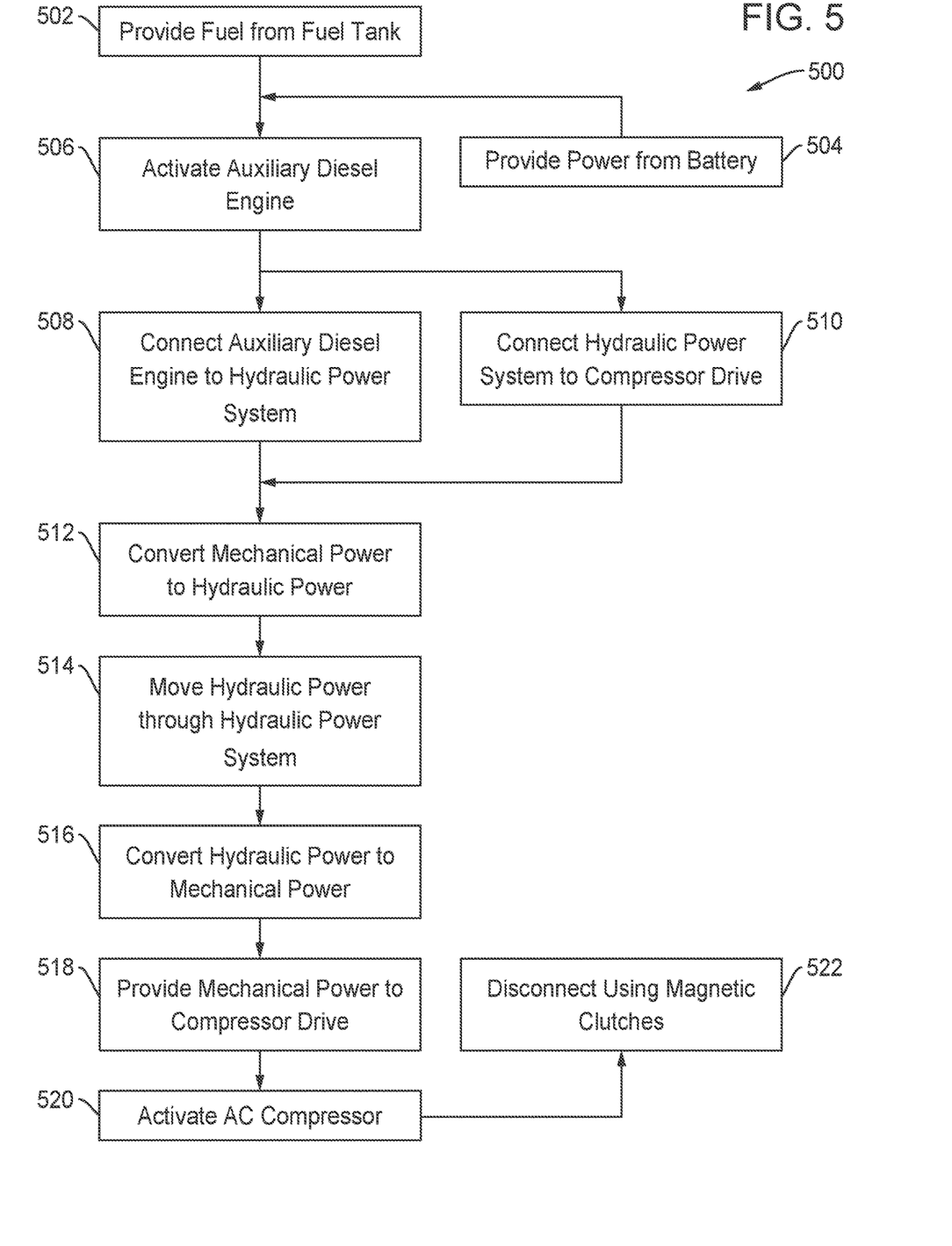
FIG. 5 illustrates a flowchart for operating an auxiliary power unit on a vehicle according to the disclosed embodiments.

FIG. 5 depicts a flowchart 500 for operating auxiliary power unit 10 on a vehicle 15 according to the disclosed embodiments. Flowchart 500 may refer to FIGS. 1-4 for illustrative purposes. Flowchart 500, however, is not limited to the embodiments disclosed by FIGS. 1-4.

Step 502 executes by providing diesel fuel from diesel fuel tank 100 of vehicle 15 to auxiliary diesel engine 45. Step 504 executes by providing power from chassis battery 115 of vehicle 15 to auxiliary diesel engine 45. These steps then help step 506 execute by activating auxiliary diesel engine 45. Exhaust from auxiliary diesel engine 45 may be diverted through existing vehicle exhaust system 140. Auxiliary diesel engine 45 may use alternator 90 to provide electrical power to chassis battery 115 and power electrical systems within vehicle 15.

Step 508 executes by connecting auxiliary diesel engine 45 to hydraulic power system 300 using first magnetic clutch 60. Main system controller 190 may activate auxiliary diesel engine 45 and connect it to hydraulic pump 95 of hydraulic power system 300 using power coupling 85. Step 510 executes by connecting hydraulic power system 300 to compressor drive 170 using second magnetic clutch 168. Again, main system controller 190 may activate compressor drive 170 to receive mechanical power generated by auxiliary diesel engine 45 via hydraulic power system 300 using power coupling 85. With auxiliary diesel engine 45 running, auxiliary power unit 10 is ready to work.

Step 512 executes by converting the mechanical power generated by auxiliary diesel engine 45 into hydraulic power using hydraulic pump 95. Hydraulic pump 95 may draw hydraulic fluid from hydraulic reservoir 160 and use it to generate hydraulic power with hydraulic pressure. Step 514 executes by moving the hydraulic power through hydraulic power system 300 using hydraulic lines 402 to move the fluid. The disclosed embodiments deliver the hydraulic fluid to hydraulic compressor drive motor 155.

Step 516 executes by converting the hydraulic power within hydraulic power system 300 to mechanical power using hydraulic compressor drive motor 155. In some embodiments, the mechanical power may be rotary power. Hydraulic compressor drive motor 155 discharges the hydraulic fluid to hydraulic filter 145. Step 518 executes by providing the mechanical power to compressor drive 170. Thus, the mechanical power needed to operate the AC system is delivered to compressor drive 170.

Step 520 executes by activating AC compressor 185 using compressor drive 170 as well as other components, such as second belt 175, second belt tensioner 176, and add-on drive pulley 180. These items operate AC compressor 185 without the need to have power from main engine 20. AC compressor 185 may activate to deliver cool air to cab area 25 or sleeper area 30 using auxiliary power unit 10. Step 522 executes by disconnecting auxiliary diesel engine 45, hydraulic power system 300, and compressor drive 170 having first magnetic clutch 60 and second magnetic clutch 168. Main system controller 190 may send a signal or command for the magnetic clutches to disconnect and shut down auxiliary power unit 10.

In alternate embodiments, current and future variations may occur with the features disclosed herein, but still within the scope of the claims. For example, the pump, motor, and lines could be sized to run at 2200 to 2500 pounds per square inch (PSI) instead of 1250 PSI. This feature would allow smaller and lighter pumps, motors, and lines. These modified items would be made with the correct shafts and shaped to fit in locations within the vehicles having a reduced size. The oil cooler size and shape also may be optimized to work more efficiently in a free air stream. The tank also could be redesigned to be mounted to be accessible while out of the way.

In further embodiments, the shock absorbing power coupling, clutch, and power coupling that connect the auxiliary diesel engine to the hydraulic pump would be built as a single unit. This unit has a receiver on both ends to fit the engine or the pump because the pump now has the same size shaft. The electromagnet would be stationary as it is mounted to a fixture. It also may hold a bearing in its core that the engine output shaft would ride in and be connected to the clutch disk, which would spin in the bearing at approximately ½ mm from the electromagnet.

In these embodiments, the pump shaft and mounting would have the spring-loaded disk approximately ½ mm from the first disk. When the magnet is energized, the disks would come together and create friction to drive the pump. The entire pump drive component would take up less than 3 inches in length and 5 inches in diameter. It also would operate at speed as long as the sealed bearings last. If shock absorbing is needed, an elastomeric sleeve could be used between the shaft or it receiver with the durometer being enough to transmit the torque while absorbing the shock.

In the main engine compartment, the AC compressors would be ordered with an extended shaft to mount a similar clutch unit as disclosed above. It also may be combined with a hydraulic motor in a flattened design that could be mounted directly onto the front of the AC compressor. This feature would allow the existing clutch to drive the compressors from the main engine. Alternatively, while disconnected, the AC compressor could be turned from the hydraulic motor. This feature would save weight and space to vastly reduce complexity.

With regard to other components, the disclosed tank vent port adapter may be unneeded if the disclosed embodiments could pull fuel from the tank without altering the existing fuel system's primary function. The disclosed tank vent port adapter avoids the APU from tampering with the vehicle's fuel system. Other ways of doing this may be configured without limiting the scope of the overall system.

It will be apparent to those skilled in the art that various modifications to the disclosed embodiments may be made without departing from the spirit or scope of the invention. Thus, it is intended that the present invention covers the modifications and variations disclosed above provided that these changes come within the scope of the claims and their equivalents.

The invention claimed is:

1. An auxiliary power system configurable within a vehicle or construction equipment having a main engine, an enclosed cabin area, and an air conditioner having an air conditioning compressor that is ordinarily driven by a primary belt-driven pulley on the air conditioning compressor receiving power from the main engine when the main engine is activated, the auxiliary power system comprising:

an auxiliary engine coupled to a hydraulic pump via a power coupling, wherein the auxiliary engine activates the hydraulic pump during operation;

a first magnetic clutch to drive the hydraulic pump through the power coupling;

a hydraulic compressor drive motor connected to the hydraulic pump via hydraulic lines, wherein the hydraulic compressor drive motor converts hydraulic power to mechanical power;

a compressor drive having a second drive belt mechanically connected directly to the hydraulic compressor drive motor to receive the mechanical power; and the air conditioning compressor within the vehicle or construction equipment having a second drive pulley on the air conditioning compressor configured to directly receive the mechanical power from the second drive belt of the compressor drive, wherein the air conditioning compressor is activated for the air conditioner to provide cooled air when the auxiliary engine is activated and the first magnetic clutch is engaged.

2. The auxiliary power system of claim 1, further comprising the first magnetic clutch to activate or deactivate the hydraulic pump through the power coupling and a second magnetic clutch to engage or disengage the hydraulic compressor drive motor.

3. The auxiliary power system of claim 1, further comprising a hydraulic filter connected to the hydraulic compressor drive motor.

4. The auxiliary power system of claim 3, further comprising a hydraulic heat exchanger connected to the hydraulic filter.

5. The auxiliary power system of claim 4, wherein the hydraulic heat exchanger controls a temperature of hydraulic fluid flowing from the hydraulic filter.

6. The auxiliary power system of claim 4, further comprising an electric fan unit to provide air to the hydraulic heat exchanger.

7. The auxiliary power system of claim 4, further comprising a hydraulic reservoir connected to the hydraulic heat exchanger to receive hydraulic fluid.

8. The auxiliary power system of claim 7, wherein the hydraulic reservoir is connected to the hydraulic pump to provide the hydraulic fluid.

9. The auxiliary power system of claim 1, wherein the auxiliary engine includes a drive pulley connected to an alternator connected to a chassis battery of the vehicle such that power is supplied to the chassis battery when the auxiliary engine is activated.

10. The auxiliary power system of claim 1, further comprising an adapter coupled to a tank vent line for a fuel tank for the vehicle, wherein the auxiliary engine obtains fuel from the fuel tank through the adapter.

11. The auxiliary power system of claim 1, further comprising a diverter valve coupled to the auxiliary engine to redirect exhaust.

12. The auxiliary power system of claim 11, further comprising an exhaust heat exchanger to receive the exhaust from the diverter valve.

13. The auxiliary power system of claim 1, further comprising a controller coupled to the auxiliary engine, the first magnetic clutch, and a second magnetic clutch at the compressor drive, wherein the controller is configured to monitor parameters including an RPM of the auxiliary engine, a temperature of the hydraulic fluid, and a temperature of coolant of the auxiliary engine within the auxiliary power system when the auxiliary engine is activated to control the auxiliary engine, the first magnetic clutch, and the second magnetic clutch.

14. The auxiliary power system of claim 1, further comprising at least one vibration isolator configured on the auxiliary engine.

15. The auxiliary power system of claim 1, further comprising an exterior enclosure adapted to be mounted on the vehicle to enclose at least the auxiliary engine.

16. An auxiliary power system configurable within a vehicle or construction equipment having a main engine and a cabin area, wherein cooled air is supplied within the cab using an air conditioning compressor of an air conditioner within the vehicle that is ordinarily driven by a primary belt-driven pulley on the air conditioning compressor receiving power from the main engine when the main engine is activated, the auxiliary power system comprising:
- an auxiliary engine having a power coupling, wherein the auxiliary engine receives fuel from a fuel tank of the vehicle or the construction equipment during operation;
- a hydraulic power system coupled to the auxiliary engine via the power coupling, wherein the hydraulic power system converts hydraulic power to mechanical power;
- a compressor drive having a second drive belt mechanically connected directly to the hydraulic power system to receive the mechanical power; and
- the air conditioning compressor within the vehicle having a second drive pulley on the air conditioning compressor configured to directly receive the mechanical power from the second drive belt of the compressor drive, wherein the air conditioning compressor is activated for the air conditioner to provide the cooled air when the auxiliary engine is activated.

17. The auxiliary power system of claim 16, wherein the hydraulic power system includes a hydraulic pump connected to the auxiliary engine through the power coupling to pump hydraulic fluid to a hydraulic compressor drive motor mechanically connected to the compressor drive.

18. The auxiliary power system of claim 16, further comprising a condensation catch basin and pump.

19. A method for operating an air conditioning compressor of an air conditioner in a vehicle or construction equipment having a cabin and a main engine wherein the air conditioning compressor is ordinarily driven by a primary belt-driven pulley on the air conditioning compressor receiving power from the main engine when the main engine is activated, the method comprising:
- activating an auxiliary engine coupled to a hydraulic pump through a power coupling, wherein the hydraulic pump moves hydraulic fluid from a hydraulic reservoir;
- receiving the hydraulic fluid from the hydraulic pump at a hydraulic compressor drive motor;
- converting hydraulic power to mechanical power at the hydraulic compressor drive motor;
- providing the mechanical power from the hydraulic compressor drive motor directly to a compressor drive having a second drive belt; and
- activating the air conditioning compressor with a second drive pulley on the air conditioning compressor driven directly by the second drive belt of the compressor drive, wherein the air conditioning provides cooled air when the auxiliary engine is operating.

20. The method of claim 19, further comprising filtering the hydraulic fluid by a hydraulic filter, wherein the hydraulic fluid is returned back to the hydraulic reservoir.

\* \* \* \* \*